United States Patent
Clark

(10) Patent No.: US 8,220,309 B2
(45) Date of Patent: Jul. 17, 2012

(54) CHARACTERISATION OF SOFT BODY IMPACTS

(75) Inventor: Daniel N S Clark, Derby (GB)

(73) Assignee: Rolls-Royce PLC, London (GB)

( * ) Notice: Subject to any disclaimer, the term of this patent is extended or adjusted under 35 U.S.C. 154(b) by 258 days.

(21) Appl. No.: 12/717,525

(22) Filed: Mar. 4, 2010

(65) Prior Publication Data

US 2010/0251801 A1 Oct. 7, 2010

(30) Foreign Application Priority Data

Apr. 7, 2009 (GB) .................................. 0905958.5

(51) Int. Cl.
*G01M 7/00* (2006.01)

(52) U.S. Cl. ..................................... 73/12.05; 73/12.11

(58) Field of Classification Search ...... 73/12.01–12.05, 73/12.11, 168
See application file for complete search history.

(56) References Cited

U.S. PATENT DOCUMENTS

| | | | |
|---|---|---|---|
| 3,974,313 A | | 8/1976 | James |
| 4,300,389 A | * | 11/1981 | Tevelow .......................... 73/167 |
| H15150 | * | 3/1993 | Fritch ............................ 102/498 |
| 5,220,128 A | * | 6/1993 | Grau et al. ..................... 102/293 |
| 5,725,449 A | * | 3/1998 | Park ................................ 474/94 |
| 2004/0037694 A1 | | 2/2004 | Mather |

FOREIGN PATENT DOCUMENTS

| | | |
|---|---|---|
| EP | 2 112 333 A2 | 10/2009 |
| FR | 1 484 155 | 6/1967 |
| JP | A-8-61086 | 3/1996 |
| WO | WO 2007/053130 A1 | 5/2007 |

OTHER PUBLICATIONS

J. Degrieck et al., "Optical measurement of target displacement and velocity in bird strike simulation experiments," Measurement Science and Technology, 2003, vol. 14, pp. 1-6.
J.P. Hou et al., "Soft body impact on laminated composite materials," Composites Part A: applied science and manufacturing, 2007, vol. 38, pp. 505-515.
European Search Report dated Jul. 13, 2010 in European Patent Application No. 10 25 0409.9.
Great Britain Search Report issued in Great Britain Patent Application No. 0905958.5 on May 26, 2009.

* cited by examiner

*Primary Examiner* — Max Noori
(74) *Attorney, Agent, or Firm* — Oliff & Berridge, PLC

(57) ABSTRACT

An apparatus for characterizing the fragmentation of a body following impact with a surface, particularly the fragmentation of a bird following impact with part of an intake of a gas turbine engine, comprises a gun, a target plate, a soft recovery plate across which the body's trajectory can be tracked, and a soft recovery system, characterized in that damage to the body is caused substantially only by the impact on the target plate.

16 Claims, 3 Drawing Sheets

CHARACTERISATION OF SOFT BODY IMPACTS

BACKGROUND

This invention relates to the design of gas turbine engines, and more particularly to the characterisation of bird impacts, which are a particular problem when such engines are used in aircraft.

Bird impacts can be very damaging to gas turbine engines, and it is necessary to design engines so that they can be safely run on for a period of time after an impact or, at the very least, safely shut down without causing danger to the aircraft or passengers.

The basic techniques for carrying out bird ingestion tests on gas turbine engines are well known, and need not be discussed in detail here.

In such a test, a soft body is fired at a known position on the inlet of the engine. The soft body may be either a dead bird or an artificial soft body designed to replicate closely the impact behaviour of a real bird. Such artificial soft bodies are well known. In the following description, the term "bird" can generally be taken to refer either to a real bird or to an artificial soft body used in place of a real bird. After an impacting bird first hits the structure of the engine (whether static or rotating structure) it will fragment. Damage may be caused to the downstream parts of the engine by these fragments, and the size and trajectories of the fragments will determine the extent of this damage. Normally, the fragmentation can be assessed by viewing photographs or video of the first impact. The observed fragmentation can then be used to model the behaviour of the different parts of the engine following an impact, and thereby to design the engine to minimise damage from bird strikes.

However, there is a problem when an engine is fitted with an obscuring intake. Such intakes are commonly used on military engines, so that the structure of the intake shields the hot components of the engine and prevents its detection by radar or other systems. The problem is that an incoming bird will strike the surface of the intake and will fragment, but the fragments are then hidden within the intake and so it is not possible to assess their size and trajectories. To obtain an initial bird condition for analysis, it is necessary to perform a separate impact test for each impact condition. This is time-consuming and expensive.

Previously, impact analyses have been undertaken using a whole, intact bird, a bird fragment or a non-validated slurry.

For the analysis of the bird strike capabilities of engines that will in use be shielded by an obscuring intake, it is vital that the initial conditions of the bird, which are used for analysis, reflect reality. Following a light impact of a bird on the intake, the bird can be modelled as a single fragment whose mass corresponds to that of the largest bird fragment. Following a severe impact, the bird can be modelled as a slurry. In between these two extremes of impact, the bird can be modelled as a combination of fragment(s) and slurry.

United Kingdom patent application GB0807482.5 describes a method for characterising the fragmentation of a soft body following impact with a surface, and its teaching is incorporated herein by reference.

One embodiment of the invention described in GB0807482.5 uses an apparatus 12 as shown in FIG. 1. A gun 14 of known type fires a bird (not shown) along a trajectory 16 to impact on a surface 18 of a target 20. The angle of impact of the bird on the surface 18 is θ. The fragmented bird is deflected off the surface 18 towards a soft-recovery system 22. This comprises a number of large plastic sacks 24 freely suspended on two parallel ropes 26 (only one is visible). The ropes 26 are rigidly fixed at their ends to structure 28. In this embodiment, ten sacks 24 are used, but any suitable number may be employed. The sacks 24 absorb energy from the bird fragments without damaging them, allowing them to fall on to a sheet 30 on the floor for collection and analysis.

BRIEF SUMMARY

A limitation of this method is that although the masses of the bird fragments can be assessed accurately, it is only possible to assess their trajectories, after impact with the target 20, for a distance of about 2 ft (0.7 m) which is the typical gap between the end of the target 20 and the first sack 24 of the soft-recovery system 22. It would be desirable to assess the trajectories of the bird fragments over a greater distance, to improve the modelling of bird strikes on gas turbine engines situated behind obscuring intakes.

Accordingly, the invention provides an apparatus and a method for characterising the fragmentation of a soft body following impact with a surface as set out in the claims.

DETAILED DESCRIPTION

An embodiment of the invention will now be described, by way of example, with reference to the accompanying drawings.

Figure 1:
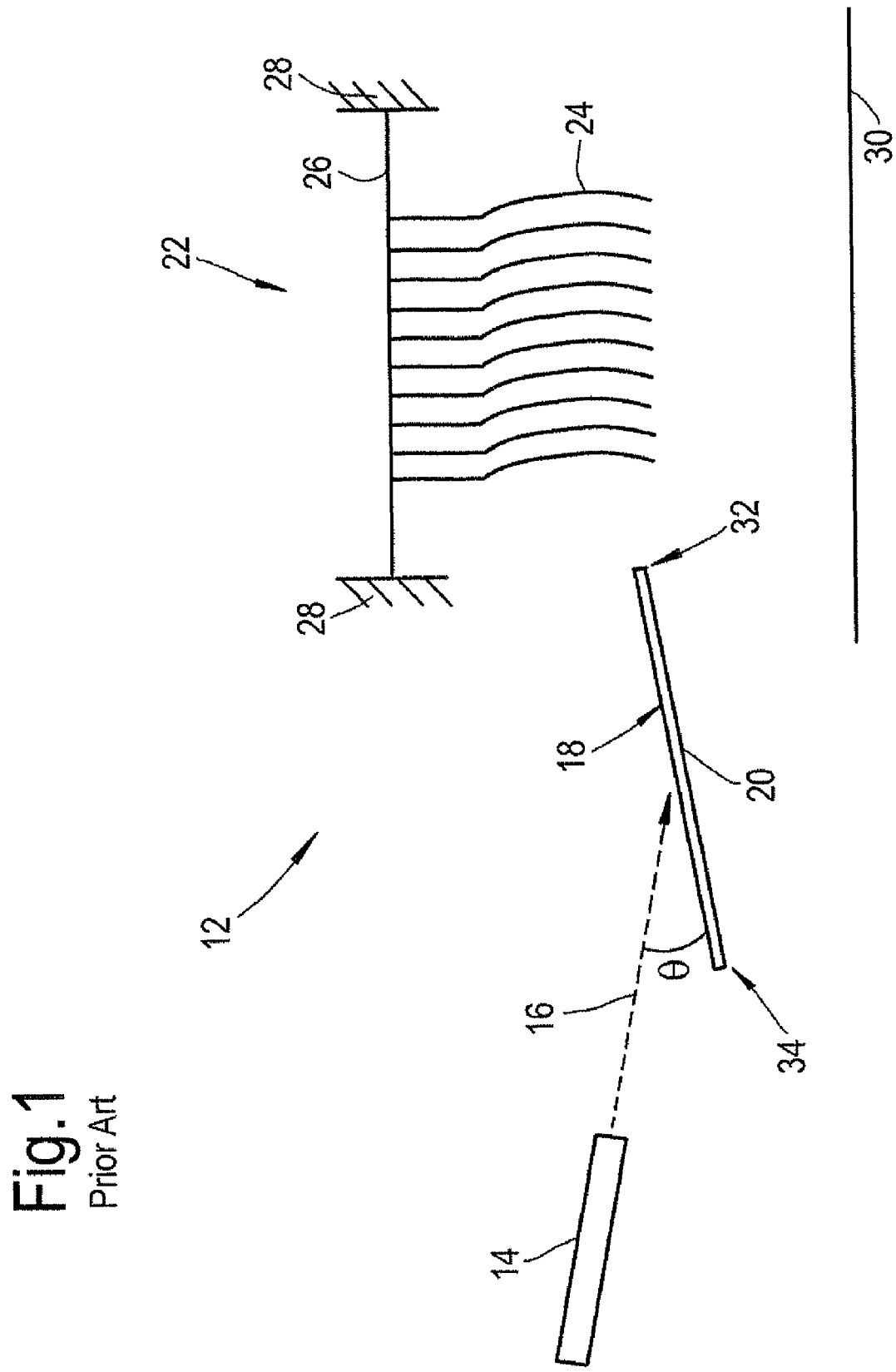
FIG. 1 depicts a conventional apparatus.
Figure 2:
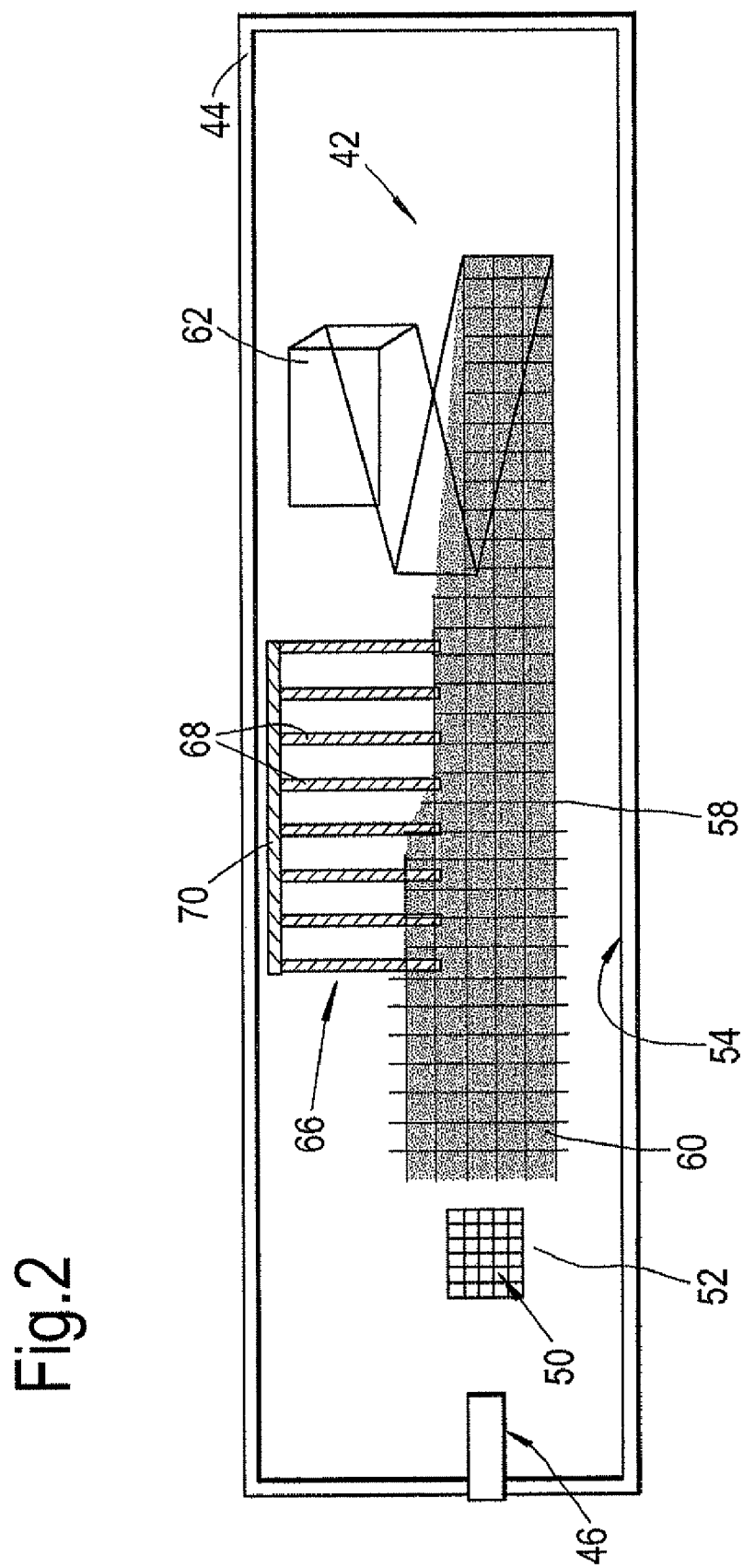
FIG. 2 is a schematic side view of an apparatus according to the invention.
Figure 3:
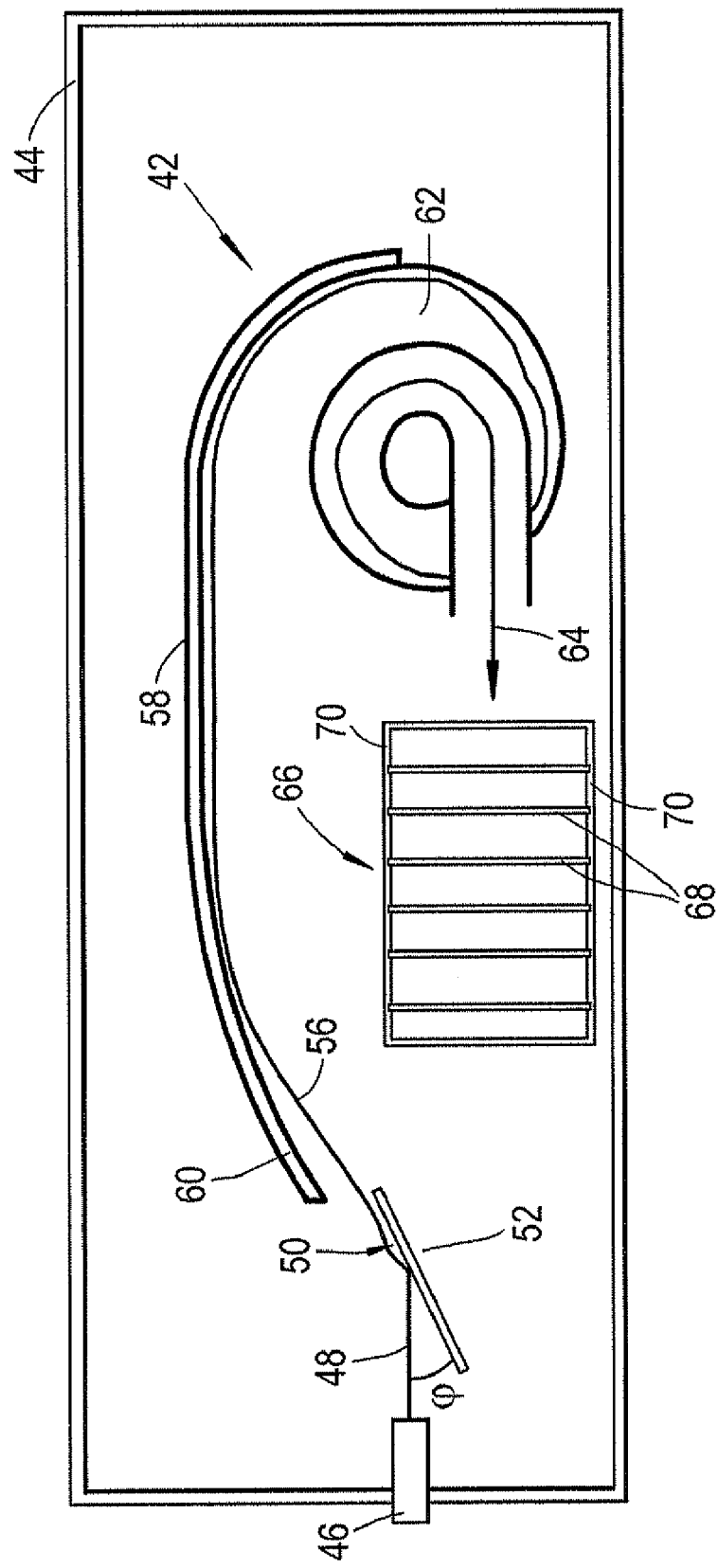
FIG. 3 is a schematic plan view of the apparatus shown in FIG. 2.

Referring to FIGS. 2 and 3, an apparatus according to the invention is shown generally at 42. The apparatus is enclosed in a chamber 44.

A gun 46 of known type fires a bird (not shown) along a trajectory (48 in FIG. 3) to impact on a surface 50 of a target plate 52. The angle of impact of the bird on the target plate 52 is indicated by φ. In this embodiment φ is approximately 25 degrees. It will be apparent from the drawings that the target plate 52 is mounted vertically, perpendicular to the floor 54 of the chamber 44. This is in contrast to the arrangement of GB0807482.5, in which the target plate was mounted essentially horizontally. The target plate 52 has a grid pattern to aid measurement of the impact characteristics. In operation, a high speed camera system is used to track the trajectory of the bird across the target plate 52. The vertical mounting of the target plate 52 makes the interpretation of the photographic images easier, because the position of the bird is easier to ascertain than with a horizontally mounted plate.

After impact with the target plate 52, the bird's continuing trajectory 56 will initially be broadly parallel to the target plate 52.

Depending on the energy and angle of impact, the bird may still be intact, having suffered only quasi-elastic deformation, or it may have broken up to a lesser or greater extent into fragments. For simplicity, the term "fragments" will be used throughout the rest of this description, but this term should be understood to encompass both a fragmented bird and one that is still intact. It will also be appreciated that the bird fragments will in fact have slightly different trajectories from one another, but for the purposes of most of this description it will suffice to refer to a single trajectory, which should be understood also to encompass the multiple trajectories of the fragments, considered together.

A soft recovery plate 58 is arranged to deflect the fragments gently and smoothly from this trajectory 56. To facilitate this, the initial part 60 of the soft recovery plate 58 is arranged to be approximately parallel to the target plate 52. The remainder of the plate 58 is gently curved to guide the fragments without damaging or breaking them up further. The soft recovery plate 58 has a grid pattern to aid measurement of the trajectory of the fragments. A high speed camera system is arranged to track the trajectories of the fragments across the soft recovery plate 58.

In this embodiment the length of the soft recovery plate 58 is about 12 feet (3.66 m). The trajectory of the bird fragments may therefore be tracked over this distance. The soft recovery plate may, of course, be made longer if the chamber 44 is large enough.

The curvature of the soft recovery plate 58 guides the fragments into a spiral duct 62. Friction between the fragments and the duct walls will tend to slow the fragments, before they exit from the duct 62 along a final trajectory 64. The fragments are directed into a soft recovery system 66.

The soft recovery system 66 is similar to that described in GB0807482.5, but offers superior performance to that system. A number of soft bags 68, each bag having a pair of looped handles (not shown), are suspended by their handles from a pair of parallel poles 70. In this embodiment the system has eight bags 68. The bags 68 absorb energy from the fragments without damaging them, allowing them to fall to the floor for collection and analysis. The bags are free to slide along the poles, thus absorbing energy from the fragments. Some of the bags may be weighted with sand to increase their inertia and thereby increase the amount of energy that can be absorbed.

It will be appreciated that various modifications may be made to the embodiment described, without departing from the principle of the invention.

It is envisaged that the invention could be employed with birds weighing between 3.5 oz (0.1 kg) and 12 lb (5.4 kg), the bird being fired at the target plate with a velocity between 30 m/s and 400 m/s.

The target plate may be mounted horizontally rather than vertically, or indeed at any convenient angle. This may be dictated by the dimensions of the chamber.

The angle of incidence $\phi$ of the bird upon the target plate may be set to any desired value. It is envisaged that the invention will find particular utility with angles between 5° and 60°. Generally, the angle of inclination of the initial part of the soft recovery plate will be the same as the angle $\phi$, although it may be beneficial in some circumstances to arrange it at a different angle.

The shape and curvature of the soft recovery plate may be arranged in any appropriate manner, to meet particular experimental requirements.

The configuration of the spiral duct may be different from that shown. In particular, it may contain fewer or more turns, or discharge the fragments in a different direction, depending on the constraints of the chamber. If enough space is available, it would be possible to dispense with the spiral duct altogether.

The soft recovery system may be provided with fewer or more bags than the eight illustrated in the described embodiment. None, some or all of the bags may be weighted, and any suitable material, not only sand, may be used for this purpose. The bags may be mounted in any suitable way, and need not be mounted on poles as shown. In particular, a soft recovery system substantially as described in GB0807482.5 may be used in place of that described.

It will also be appreciated that the invention can be used in any application in which a bird or other similar soft body is in collision with a stationary surface, and in which it is desirable to understand the behaviour of the system after the collision. It could be used to analyse the behaviour of gelatine birds, or could be used to analyse the behaviour of ice.

The invention therefore provides a method and apparatus for characterising the fragmentation of a soft body following impact with a surface, in which the trajectories of the bird fragments may be tracked and measured over a considerably greater distance than in known arrangements. This permits improved modelling of bird impacts on gas turbine engines behind obscuring intakes.

It will be appreciated that this method can also be used to model the impact characteristics of birds or similar bodies with other structures, such as aircraft, trains, and boats.

The invention claimed is:

1. An apparatus for characterising the fragmentation of a body following impact with a surface, the apparatus comprising:
   a gun;
   a fixed target plate;
   a soft recovery plate across which a trajectory of the body, or fragments thereof can be tracked; and
   a soft recovery system, wherein
      damage to the body is caused substantially only by the impact on the fixed target plate, and
      the apparatus is configured in such way that the body strikes the surface of the fixed target plate at an acute angle, such that upon impact, the body is deflected by the fixed target plate.

2. The apparatus as claimed in claim 1, in which in use the body is fired from the gun towards the fixed target plate at a predetermined angle to the fixed target plate.

3. The apparatus as claimed in claim 2, in which the predetermined angle is about 25 degrees.

4. The apparatus as claimed in claim 1, in which an initial portion of the soft recovery plate is approximately parallel to an expected trajectory of the body or the fragments thereof deflected from the fixed target plate.

5. The apparatus as claimed in claim 1, in which the soft recovery plate is curved so as to guide the trajectory of the body or the fragments thereof.

6. The apparatus as claimed in claim 1, further comprising a spiral duct between the soft recovery plate and the soft recovery system.

7. The apparatus as claimed in claim 1, further comprising photographic equipment arranged to record the trajectory of the body or the fragments thereof across the soft recovery plate.

8. The apparatus as claimed in claim 1, wherein a length of the soft recovery plate is about 12 feet.

9. An apparatus for characterising the fragmentation of a body following impact with a surface, the apparatus comprising:
   a gun;
   a target plate;
   a soft recovery plate across which a trajectory of the body, or fragments thereof can be tracked;
   a soft recovery system; and
   a spiral duct between the soft recovery plate and the soft recovery system, wherein
      damage to the body is caused substantially only by the impact on the target plate.

10. The apparatus as claimed in claim 9, in which in use the body is fired from the gun towards the target plate at a predetermined angle to the target plate.

11. The apparatus as claimed in claim 10, in which the predetermined angle is about 25 degrees.

12. The apparatus as claimed in claim 9, in which an initial portion of the soft recovery plate is approximately parallel to an expected trajectory of the body or the fragments thereof deflected from the target plate.

13. The apparatus as claimed in claim 9, in which the soft recovery plate is curved so as to guide the trajectory of the body or the fragments thereof.

14. The apparatus as claimed in claim 9, further comprising photographic equipment arranged to record the trajectory of the body or the fragments thereof across the soft recovery plate.

15. The apparatus as claimed in claim 9, wherein a length of the soft recovery plate is about 12 feet.

16. A method for characterizing the fragmentation of a body following impact with a surface, the method comprising:
- firing a body along a trajectory to impact at an acute angle on the surface of a target plate so that the body is deflected by the target plate;
- tracking a continuing trajectory of the body across a soft recovery plate; and
- recovering the body or the fragments thereof in a soft recovery system; wherein
  - damage to the body is caused substantially only by the impact on the target plate.

* * * * *